(12) United States Patent
Eilert

(10) Patent No.: US 9,104,690 B2
(45) Date of Patent: Aug. 11, 2015

(54) TRANSACTIONAL MEMORY

(75) Inventor: Sean Eilert, Penryn, CA (US)

(73) Assignee: Micron Technology, Inc., Boise, ID (US)

( * ) Notice: Subject to any disclaimer, the term of this patent is extended or adjusted under 35 U.S.C. 154(b) by 487 days.

(21) Appl. No.: 13/015,396

(22) Filed: Jan. 27, 2011

(65) Prior Publication Data

US 2012/0198205 A1     Aug. 2, 2012

(51) Int. Cl.
*G06F 7/00* (2006.01)
*G06F 11/30* (2006.01)
*G06F 11/14* (2006.01)

(52) U.S. Cl.
CPC .......... *G06F 11/302* (2013.01); *G06F 11/3037* (2013.01); *G06F 11/3055* (2013.01); *G06F 11/1456* (2013.01)

(58) Field of Classification Search
CPC ........................ G06F 11/1456; G11B 20/1883
USPC .................................... 711/103, 162; 365/163
See application file for complete search history.

(56) References Cited

U.S. PATENT DOCUMENTS

| | | | |
|---|---|---|---|
| 7,266,669 B2 | 9/2007 | Matsui et al. | |
| 7,389,308 B2 | 6/2008 | Bailey | |
| 7,856,522 B2* | 12/2010 | Lee et al. | 711/103 |
| 7,971,022 B2 | 6/2011 | Kim et al. | |
| 8,589,341 B2 | 11/2013 | Golde et al. | |
| 2004/0243535 A1* | 12/2004 | Bailey | 707/1 |
| 2006/0136693 A1 | 6/2006 | Baxter et al. | |
| 2007/0156994 A1 | 7/2007 | Akkary et al. | |
| 2008/0005504 A1 | 1/2008 | Barnes et al. | |
| 2011/0051507 A1* | 3/2011 | Sarkar et al. | 365/163 |

FOREIGN PATENT DOCUMENTS

| | | |
|---|---|---|
| CN | 1647049 A | 7/2005 |
| CN | 1652111 | 8/2005 |
| CN | 1755673 | 4/2006 |
| CN | 10-1027651 A | 8/2007 |
| CN | 101187934 | 5/2008 |
| CN | 101315613 | 12/2008 |
| JP | 2002-203216 | 7/2002 |
| JP | 2004-362570 | 12/2004 |
| JP | 2006-106868 | 4/2006 |
| JP | 2008-287398 | 11/2008 |
| JP | 2008-299848 | 12/2008 |
| KR | 10-2008-0076981 | 8/2008 |
| KR | 10-2009-0025295 | 3/2009 |
| TW | 200636459 | 10/2006 |
| TW | 200839568 | 10/2008 |
| TW | 200839568 A | 10/2008 |
| WO | WO 2005/038660 | 4/2005 |

(Continued)

OTHER PUBLICATIONS

Office Action dated Feb. 17, 2014 in corresponding Taiwan Patent Application No. 100144702, filed Dec. 5, 2011, 14 pages.

(Continued)

*Primary Examiner* — Aimee Li
*Assistant Examiner* — Trang Ta
(74) *Attorney, Agent, or Firm* — Knobbe, Martens, Olson & Bear, LLP

(57) ABSTRACT

Subject matter disclosed herein relates to techniques to perform transactions using a memory device.

20 Claims, 5 Drawing Sheets

(56) References Cited

FOREIGN PATENT DOCUMENTS

| WO | WO 2010/077850 | 7/2010 |
| WO | WO 2010/077884 | 7/2010 |

OTHER PUBLICATIONS

Notice of Rejection Grounds dated Oct. 1, 2013 in corresponding Japanese Patent Application No. 2011-278132.

Office Action dated Jun. 13, 2014 in corresponding Taiwan Patent Application No. 100144702, filed Dec. 5, 2011, 15 pages.

Taiwanese Office Action dated Oct. 29, 2014 in corresponding Taiwan Patent Application No. 100144702, 4 pages.

Office Action dated Jul. 2, 2014 in corresponding Chinese patent Application No. 201110461315.2 filed Dec. 30, 2011, 23 pages.

Office Action dated Mar. 11, 2015 in corresponding Patent Application No. 201110461315.2.

* cited by examiner

TRANSACTIONAL MEMORY

BACKGROUND

1. Field

Subject matter disclosed herein relates to techniques to perform transactions using a memory device.

2. Information

In some applications, it may be desirable to treat a set of instructions as a single operation, called a transaction. For example, a transaction may comprise a begin-event followed by a plurality of instructions or operators that may result in a write to a memory, and an end-event. A transaction may not be partially completed but may either be performed completely and successfully, or fail. In other words, either all or none of the instructions or operators of a transaction are successfully performed. Managing transactions may be a relatively complex task, involving a relatively large amount of software overhead of an operating system of a computing architecture, for example. It may be desirable to reduce such software overhead and complexity.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
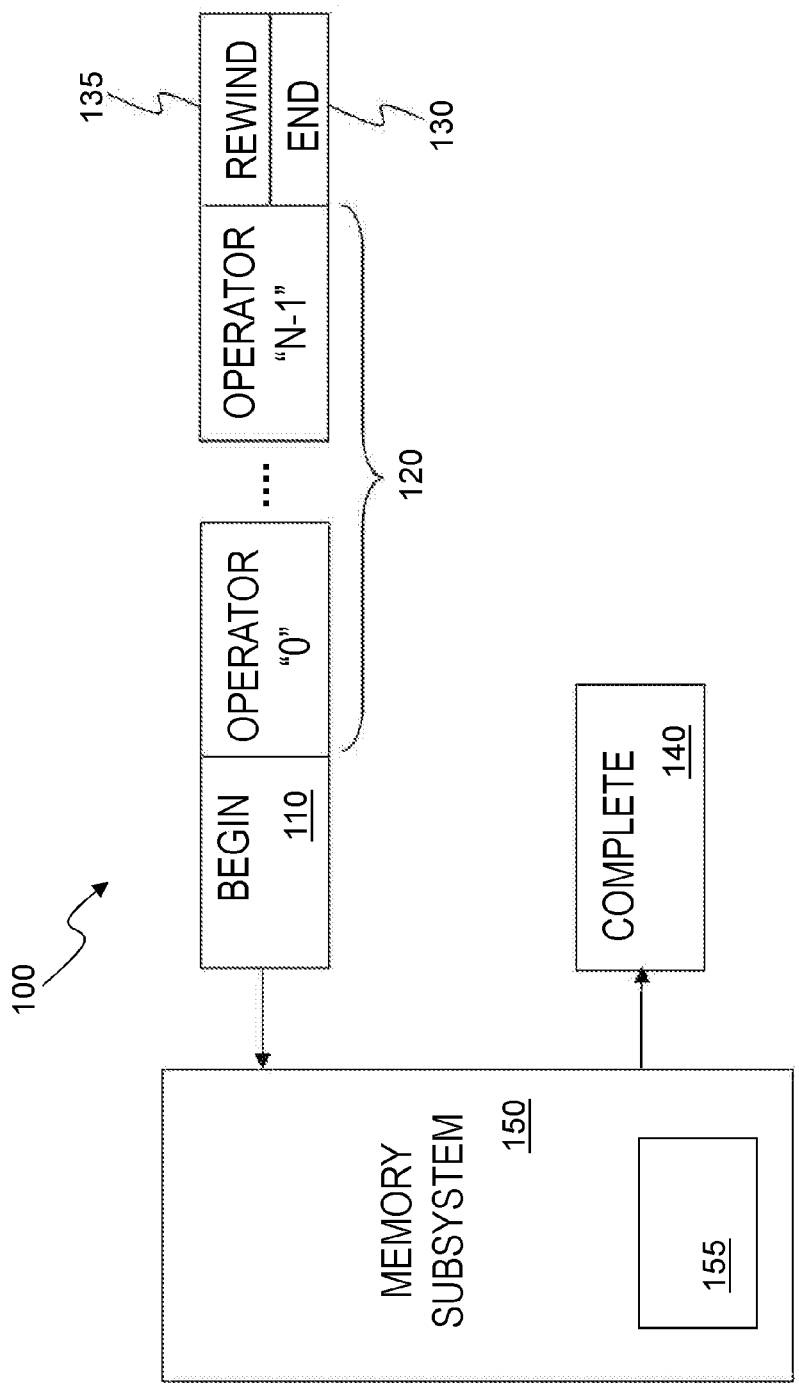
FIG. 1 is a state diagram of events according to a transaction protocol, according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

In an embodiment, techniques and/or architecture to perform one or more transactions may provide a benefit of reducing software complexity and/or memory overhead of an operating system, for example, by remapping physical memory during a process of performing the transactions. Such transactions may comprise a set of instructions or operators to be performed in atomic fashion as a single operation. Here, a transaction performed in an "atomic fashion" refers to a transaction that is not to be partially completed, but is either fully carried out or the transaction fails leaving the prior state intact. For example, a transaction may comprise a plurality of instructions or operators to write particular information to a memory. Such a transaction may comprise a begin-event and an end-event, which is called a "commit". As just mentioned, such a transaction may not be partially completed but may either be performed completely and successfully or fail. In other words, either all or none of the instructions or operators of a transaction may be successfully executed.

An embodiment may include a memory subsystem that operates based, at least in part, on a transaction protocol defining a transaction. For example, such a transaction protocol may be associated with SQL, comprising a database computer language known in the art, though claimed subject matter is not so limited. Such a transaction may include instructions for a memory subsystem to execute a start signal and a series of write operators followed by a commit operator, for example. Such a commit operator may be executed by the memory subsystem to conclude a transaction in an atomic fashion so that either all or none of the write operators are performed. Such a memory subsystem may perform multiple independent transactions. In one implementation, a memory subsystem may perform one or more transactions using a remapping table to map system-level addresses to physical memory addresses. For example, such a transactional solution may be performed by rewriting portions of a remapping table in response to receiving a commit operator, as described in detail below. In one implementation, a memory subsystem may act as a relational database subsystem, which may involve additional knowledge of a database structure to be transferred to a transaction engine. Such additional information, for example, may specify which keys link one table to another table and field definitions for such tables. In another implementation, a memory subsystem may act as an IO subsystem that supports transactions. Such a subsystem may operate on sectors and has no knowledge of what information the sectors store. In this case, relational database software may manage the database transactions and translate the transactions into sector level transactions.

In an implementation, techniques and/or architecture described herein to perform one or more transactions may utilize system infrastructure that includes memory remapping capability. For example, relatively large memory subsystems may include software and/or hardware by which pages or sectors of the memory subsystem may be remapped to isolate defective portions of memory and/or to ensure comparable levels of wear across relatively large portions of memory space. Such software and/or hardware may also be used to execute atomic transactions, as explained in detail below.

In one particular embodiment, a memory subsystem to perform transactions in an atomic fashion may operate using a transaction protocol, as mentioned above. Such a protocol may define individual transaction commands as comprising begin, payload, and end portions. Such a protocol may accommodate multiple simultaneous transaction commands while providing status of transactions to a host that initiated the transaction commands. For example, such status may comprise "transaction A complete", "transaction A not complete", "transaction B not complete", and so on. Upon receipt of a begin portion of a transaction command, a memory subsystem may create a temporary copy of one or more remapping tables to be used for executing the transaction. Since a transaction may only affect a small portion of a remapping table, the memory subsystem may merely duplicate those portions of the table to be changed during execution of the transaction. Also as a result of receiving a begin portion of a transaction, portions of memory (e.g., pages and/or sectors) may be duplicated in the memory subsystem. In one implementation, such a duplication process may leave original portions of the memory intact while duplicates of the memory portions may be changed, rewritten, and/or manipulated. In another implementation, such a duplication process may leave duplicates of the memory portions intact while original portions of the memory may be changed, rewritten, and/or manipulated. Individual operators of a transaction command may lead to changes, rewrites, and/or other such manipulation of original or temporary copies of remapping tables as well. Upon receipt of an end or commit portion of a transaction command, a memory subsystem may ensure that all operators included in a transaction command are successfully completed, and that temporary copies of remapping tables are intact. If successfully completed, a register may be set to indicate that temporary copies of the remapping tables are to be consolidated into a master remapping table. For example, information contained in the temporary copies of the remapping tables may be included in a master remapping table after such consolidation. Setting of such a register may complete a transaction. Such temporary copies of remapping tables need not be complete copies of the master remapping table. For example, temporary copies may merely represent portions of the master remapping table that comprise changes related to the transaction at hand. In one implementation, temporary copies of remapping tables need not be generated. Instead, the master remapping table may be (slightly) expanded to include bits indicating that portions of the remapping table are involved in specific transactions. Such particular portions may be treated as portions of incomplete transaction operations until the transaction is 'committed', at which point such expanded portions of the remapping table may be acted on as permanent records of the master remapping table.

In one implementation, a memory subsystem capable of processing multiple transaction commands may be able to create and/or manipulate multiple temporary copies of portions of a master remapping table, as described above. In a case where simultaneously active transactions are allowed to affect a common subset of memory pages, a memory subsystem may keep track of an order in which transactions are to be processed. Of course, details of such a memory subsystem are merely examples, and claimed subject matter is not so limited.

In a particular implementation, a method of executing a transaction may include receiving a transaction request, multiple transaction operators, and/or a transaction commit, as discussed above. For example, a memory controller comprising circuitry and/or software may receive such a transaction request from a host. In one implementation, such a memory controller may produce a copy of a portion of contents of a memory in a memory device (which may or may not also include the memory controller) in response to receiving a transaction request from a host or other entity. Such a copy may allow preservation of original contents stored in memory in case a transaction fails. For example, a transaction command may include a plurality of operators to write to a particular portion of memory, which may already include particular stored information. Thus, write operators of the transaction command may "write over" (e.g., rewrite or an erase-write operator sequence, depending, at least in part, on the type of memory used) the stored information of the particular portion of memory. If the transaction fails after even a portion of such write operators have been executed, then original stored information may be lost. However, having a copy of the original stored information may provide a way to recover such original stored information. Accordingly, one or more portions of memory that may be affected by a transaction command may be copied prior to executing operators of the transaction command.

As mentioned above, a controller may modify information of copies of memory in response to receiving one or more transaction operators of a transaction command. In particular, the originating memory may be left intact and not modified by the transaction operators. In one implementation, a memory subsystem may operate on sectors of memory. In such a case, it may be possible to allocate a new empty sector rather than copying original memory as described above. Sectors may be completely rewritten upon being updated. Accordingly, the memory subsystem may be receiving complete contents of a sector to be modified, thereby obviating a need to copy original contents of memory.

A transaction command may be initiated by an operating system or processor of a computing device or other such hosting entity. For example, write operators of the transaction command may lead to rewriting contents of the memory copies. In one implementation, the controller may maintain a temporary remap table to point to a physical location in the memory where one or more copies are located. Such a temporary remap table may be modified in response to receiving one or more transaction operators from a host. For example, such transaction operators may lead to relocation of memory copies. Thus, a temporary remap table may be modified to track such relocation. In an implementation, a memory controller may simultaneously maintain one or more additional temporary remap tables corresponding to one or more additional transactions commands. For example, maintaining multiple temporary remap tables simultaneously may enable a memory controller to execute multiple transactions.

In an embodiment, in addition to maintaining one or more temporary remap tables, a memory controller may maintain a master remap table to point to physical locations in the memory. Such a master remap table may be modified based, at least in part, on contents of one or more temporary remap tables. Such modification of a master remap table may be performed consequent to receiving a commit portion of a transaction command. However, modification of a master remap table may be based, at least in part, on whether the transaction was successful or failed. For example, if the transaction was successful then contents of modified copies of memory, as discussed above, may be used to over-write original contents of memory (from which the modified copied originated). Also, a master remap table may be modified to reflect the fact that contents of modified copies may now be currently stored in the original memory location, for example. On the other hand, if the transaction was not successful then contents of modified copies of memory, may be abandoned in the sense that such contents are not be used and may be over-written or erased. This is because data or information modified as a result of executing a transaction is not to be retained if the transaction failed. Instead, data or information is to be "returned" to its original content. As explained above, copied portions of memory allow such a return to original content, since such copies are modified while original memory portions are left unchanged (e.g., preserved) during transactions. Also, a master remap table may be modified to reflect the fact that contents of modified copies are not to be used, whereas currently stored contents in original memory locations are to be used instead, for example.

In a particular implementation, which need not be involved with transaction processes, such a master remap table may also be used for memory wear-leveling operations and/or bad memory-replacement operations. For example, a master remap table may maintain information regarding blocks of memory relocated due to bad blocks and/or excessively-used blocks of a memory array. Thus, a master remap table may be involved in multiple uses: wear-leveling or bad-block management and/or transactions, for example.

FIG. 1 is a state diagram of events according to a transaction protocol, according to an embodiment. For example, a memory controller to perform a transaction may operate based, at least in part, on such a transaction protocol. In such a transaction protocol, a host may initiate a transaction by providing a transaction command 100 to memory subsystem 150. Such a transaction command may comprise a begin portion 110, a payload portion 120, a rewind portion 135, and an end portion 130. Payload portion 120 may include a plurality of N operators, beginning with operator "0" and ending with operator "N−1", for example. As mentioned above, end portion 130 may comprise a transaction commit to conclude a transaction. Rewind portion 135 may occur in place of end portion 130 in some circumstances. For example, if rewind portion 135 is received instead of end portion 130, all of the operations in command 100 may be abandoned. In one implementation, memory subsystem 150 may comprise a memory device 155 to perform one or more transactions. An example of such a memory subsystem will be explained in further detail in descriptions for FIG. 3. Such a memory subsystem may provide notification to the host as to whether the transaction successfully completed or failed. For example, in response to successfully completing all operators of transaction command 100, memory subsystem 150 may provide a "complete" notification 140 to the host. Of course, such details of a transaction protocol are merely examples, and claimed subject matter is not so limited.

Figure 2:
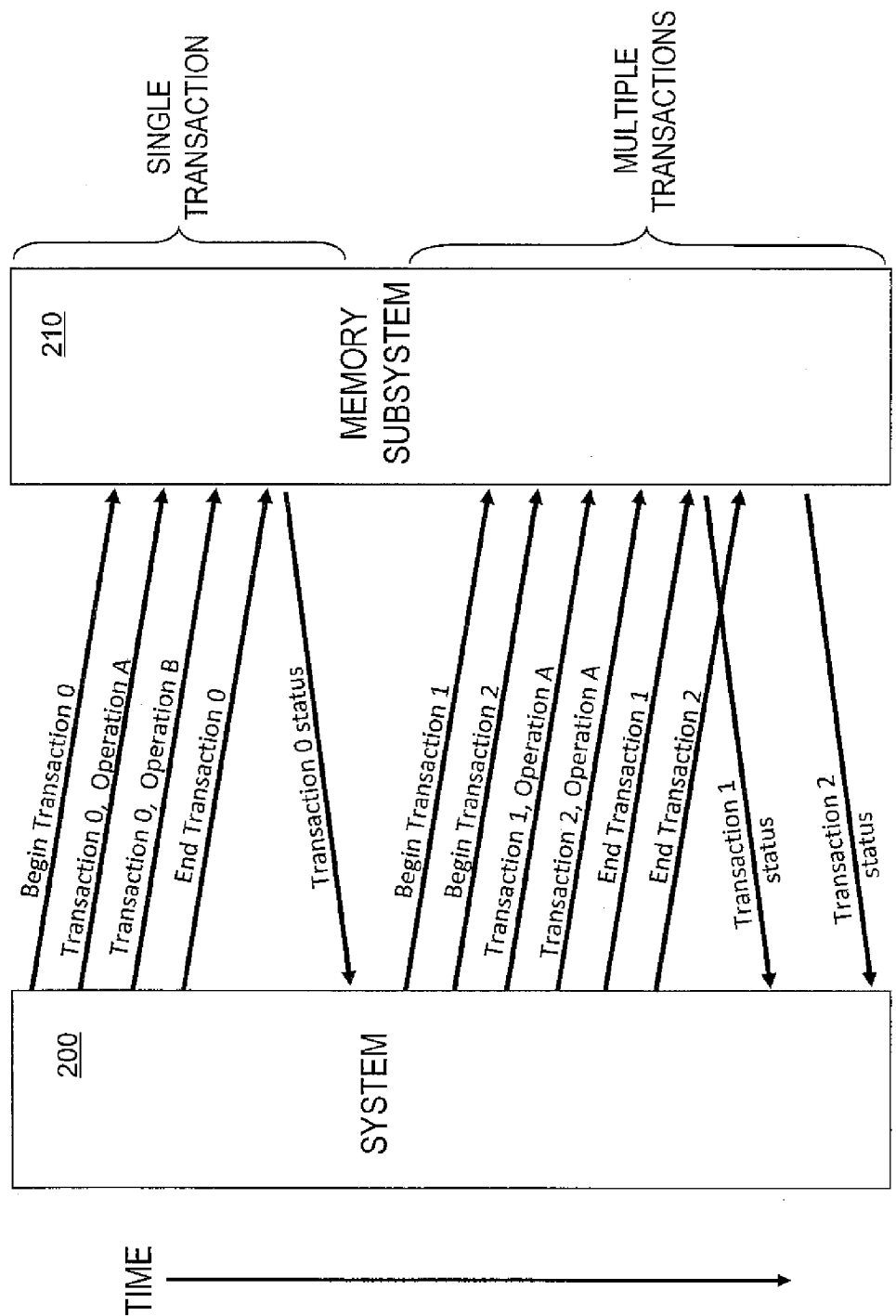
FIG. 2 is a state diagram of transactions, according to an embodiment.

FIG. 2 is a state diagram of transactions, according to an embodiment. Time advances vertically downward in FIG. 2. Such transactions, as mentioned above, may be initiated by a host or system 200 and performed by a memory subsystem 210. For example, such a host or system 200 may comprise a computing platform executing an application and memory subsystem 210 may comprise one or more memory devices. One or more such transactions may be executed concurrently. For an example of a single transaction, transaction 0 may begin by system 200 providing a begin portion of transaction command for transaction 0. In response, memory subsystem 210 may prepare to receive and execute subsequent transaction operators, such as operator A and operator B. As explained above, such preparation may include generating copies of portions of memory that may be affected by operators A, B, and so on. Thus, such operators need not modify original memory contents, which are preserved in case transaction 0 fails. Upon receiving an end portion of a transaction command for transaction 0 from system 200, memory subsystem 210 may determine whether transaction 0 successfully completed or failed. In either case, memory subsystem 210 may inform system 200 of such outcome.

For an example of concurrently executing multiple transactions, transactions 1 and 2 may begin by system 200 providing a begin portion of transaction commands for both transactions. In response, memory subsystem 210 may prepare to receive and execute subsequent transaction operators, such as operator A of both transactions. As explained above, such preparation may include generating copies of portions of memory that may be affected by the operators. Thus, such operators need not modify original portions of memory, and information need not be lost in case either of transactions 1 or 2 fails. Though a particular order is shown in FIG. 2, operators of multiple transactions may be performed in any order. For example, operator A of a transaction command for transaction 1 may be performed before operator A of a transaction command for transaction 2. Upon receiving an end portion of a transaction command for transaction 1 from system 200, memory subsystem 210 may determine whether transaction 1 successfully completed or failed. In either case, memory subsystem 210 may inform system 200 of such outcome. Similarly, upon receiving an end portion of transaction 2 from system 200, memory subsystem 210 may determine whether transaction 2 successfully completed or failed. In either case, memory subsystem 210 may inform system 200 of such outcome.

In one implementation, memory subsystem 210 may comprise a register (not shown) comprising contents to determine a maximum number of allowed transaction operators and/or a maximum size of a portion of memory for one or more transactions. For example, such a register may comprise contents to indicate that the number of operators of a transaction is limited to 500 such operators. As another example, such a register may comprise contents to indicate that a maximum size of a portion of memory to be used for a particular transaction is limited to 100 pages or sectors. Of course, such details of techniques involved in performing transactions are merely examples, and claimed subject matter is not so limited.

Figure 3:
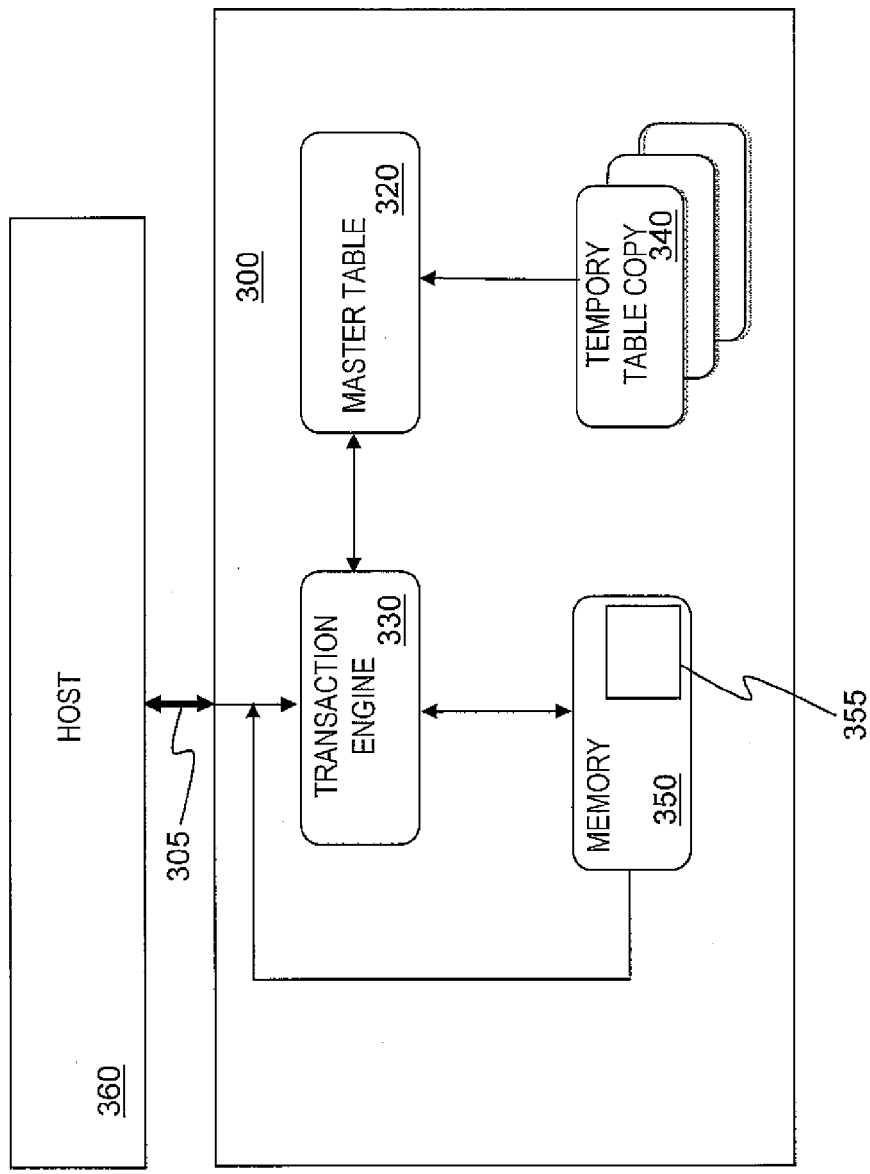
FIG. 3 is a block diagram showing a memory subsystem, according to an embodiment.

FIG. 3 is a block diagram showing a memory subsystem 300 and a host 360, according to an embodiment. For example, memory subsystem 300 may comprise a memory device that includes a memory array and/or a controller and host 360 may comprise a processor. Though arrows in FIG. 3 may indicate direction, claimed subject matter is not limited to any such direction. As discussed above, a transaction command may include a transaction request, one or more transaction operators, and/or a transaction commit. A memory controller to execute a transaction may comprise a transaction engine 330. Such a memory controller may receive a transaction command from host 360 via a line or bus 305, for example. In one implementation, such a memory controller may produce one or more copies of a portion of contents of a memory 350 in memory subsystem 300 in response to receiving a transaction command from host 360. Such memory copies may be located in a spare region 355 of memory 350, though claimed subject matter is not so limited. As mentioned above, the memory controller may modify information of copies of memory in response to receiving the one or more transaction operators of the transaction command. For example, write operators of the transaction command may lead to rewriting contents of the memory copies. In one implementation, the memory controller may maintain one or more temporary remap tables 340 to point to a physical location in memory 350, such as spare region 355, where one or more copies are located. Such temporary remap tables 340 may be modified in response to receiving one or more transaction operators in a transaction command. For example, such transaction operators may lead to relocation of memory copies. Thus, temporary remap tables 340 may be modified to track such relocation. In additional to maintaining one or more temporary remap tables, a memory controller may maintain a master remap table 320 to point to physical locations in memory 350. Such a master remap table may be modified by transaction engine 330 based, at least in part, on contents of one or more temporary remap tables 340. Such modification of master remap table 320 may be performed consequent to receiving a commit portion of a transaction command. However, modification of master remap table 320 may be based, at least in part, on whether the transaction was successful or failed, as explained above.

Figure 4:
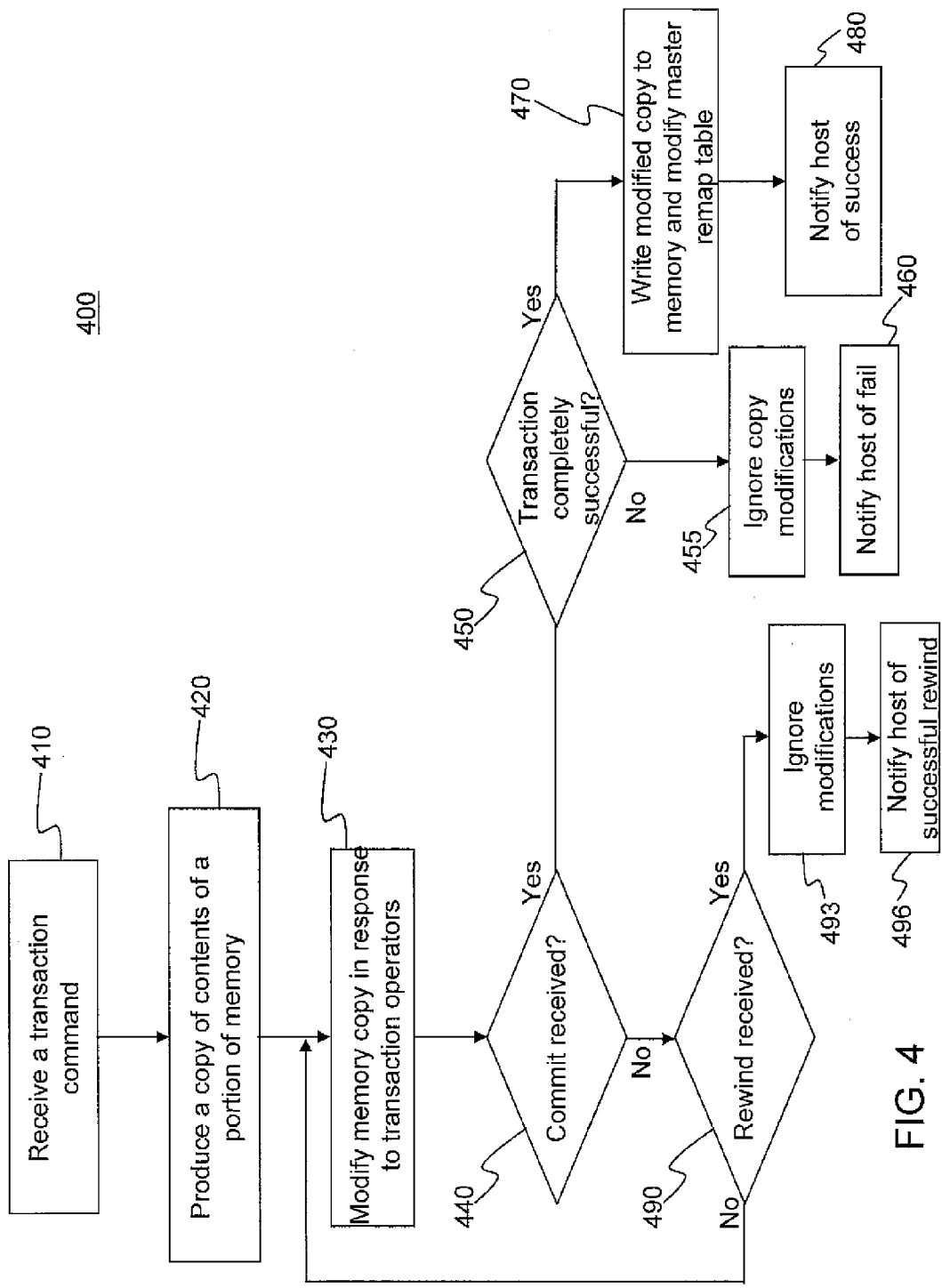
FIG. 4 is a flow diagram of a transaction process, according to an embodiment.

FIG. 4 is a flow diagram of a transaction process 400, according to an embodiment. At block 410, a memory subsystem comprising a memory controller may receive a transaction command comprising a transaction request, one or more transaction operators, and/or a transaction commit, as discussed above. At block 420, such a memory controller may produce a copy of a portion of contents of a memory in a memory device. Such a copy may allow preservation of original contents stored in memory, in case a transaction fails, as discussed above. At block 430, the memory controller may modify information of copies of memory in response to receiving the one or more transaction operators of the transaction command. For example, write operators of the transaction command may lead to rewriting contents of the memory copies. In one implementation, the memory controller may maintain a temporary remap table to point to a physical location in the memory where one or more copies are located, which may be in a spare region of memory, such as spare memory 355 shown in FIG. 3, for example. Such a temporary remap table may be modified in response to receiving one or more transaction operators in a transaction command. At diamond 440, a determination may be made as to whether a commit of the transaction command is received, signifying an end to the transaction command. If a commit is received, then process 400 may proceed to diamond 450, where a determination may be made as to whether the transaction was successfully completed. If not, then contents of modified copies of memory may not be used and may be over-written and/or erased, as indicated at block 455. Process 400 may then proceed to block 460, where the memory subsystem may inform the host of the failure. However, if the transaction was successfully completed, then process 400 may proceed to block 470, where contents of modified copies of memory, as discussed above, may be used to over-write original contents of memory. Also, a master remap table may be modified to reflect the fact that contents of modified copies may now be currently stored in the original memory location, for example. At block 480, the memory subsystem may inform the host that the transaction was successfully completed. However, if no such commit is received at diamond 440, then process 400 may proceed to diamond 490, where a determination may be made as to whether a rewind command to abandon modifications is received. If no such rewind command is received, then process 400 may return to block 430, where memory copies may be further modified in response to receiving subsequent transaction operators. However, if a rewind command is received, then process 400 may proceed to block 493, where contents of modified copies of memory may be ignored, may not be used, and/or may be over-written and/or erased. Process 400 may then proceed to block 496, where the memory subsystem may inform the host of the successful or complete rewind process. Of course, such details of process 400 are merely examples, and claimed subject matter is not so limited.

Figure 5:
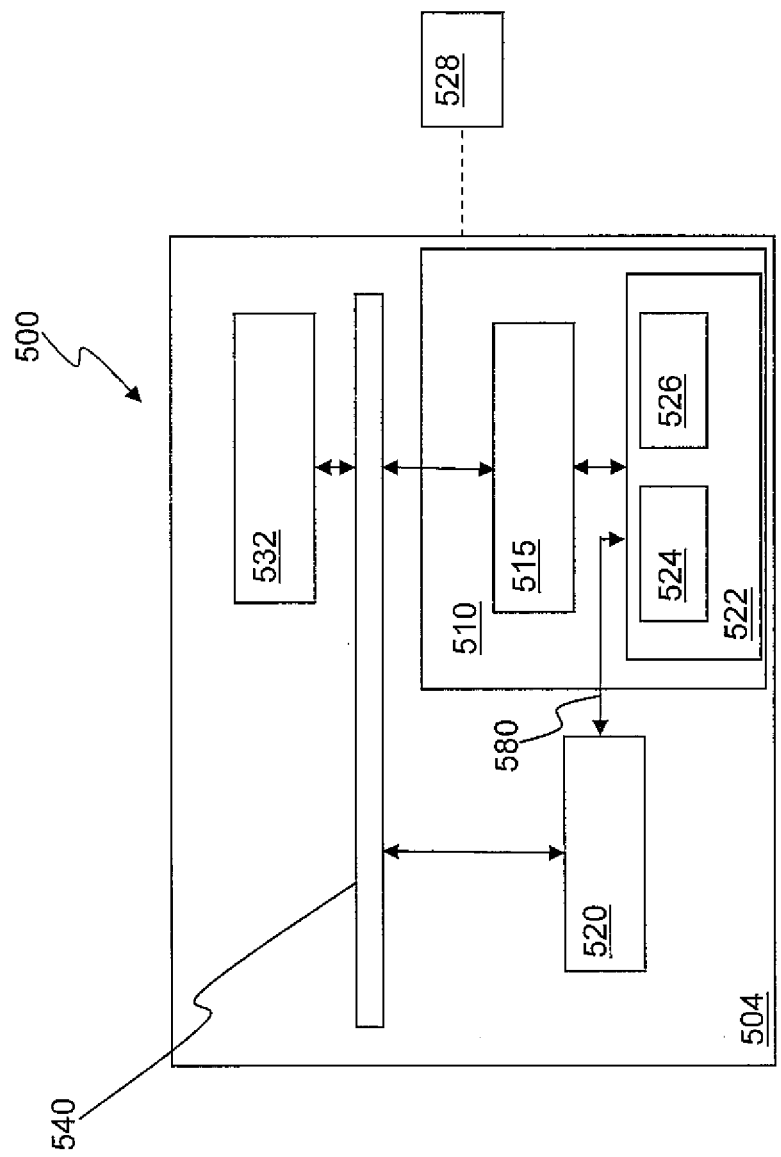
FIG. 5 is a schematic diagram illustrating an exemplary embodiment of a computing system.

FIG. 5 is a schematic diagram illustrating an exemplary embodiment of a computing system 500 including a memory device 510. Such a computing device may comprise one or more processors, for example, to execute an application and/or other code. For example, memory device 510 may comprise a memory that includes a portion of PCM 100, shown in FIG. 1. A computing device 504 may be representative of any device, appliance, or machine that may be configurable to manage memory device 510. Memory device 510 may include a memory controller 515 and a memory 522. By way of example but not limitation, computing device 504 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system; and/or any combination thereof.

It is recognized that all or part of the various devices shown in system 500, and the processes and methods as further described herein, may be implemented using or otherwise including hardware, firmware, software, or any combination thereof. Thus, by way of example but not limitation, computing device 504 may include at least one processing unit 520 that is operatively coupled to memory 522 through a bus 540 and a host or memory controller 515. Processing unit 520 is representative of one or more circuits configurable to perform at least a portion of a data computing procedure or process. By way of example but not limitation, processing unit 520 may include one or more processors, controllers, microprocessors, microcontrollers, application specific integrated circuits, digital signal processors, programmable logic devices, field programmable gate arrays, and the like, or any combination thereof. Processing unit 520 may include an operating system configured to communicate with memory controller 515. Such an operating system may, for example, generate transaction commands to be sent to memory controller 515 over bus 540. Such transaction commands may include operators that comprise read and/or write commands, for example. In an implementation, bus 540 may comprise a portion of an Ethernet, wireless local area network (LAN), a cellular network, serial advanced technology attachment (SATA), serial attached SCSI (SAS), or peripheral component interconnect express (PCIe) card, just to name a few examples. In response to receiving a transaction command, for example, memory controller 515 may perform process 400 described above, to execute such a transaction. In one implementation, system 500 may comprise memory device 510 including at least one memory array, for example. Such a memory device may further include memory controller 515 to receive a transaction command comprising a transaction request, one or more transaction operators, and/or a transaction commit. Memory controller 515 may further produce a copy of a portion of contents of the at least one memory array in response to receiving the transaction command. Memory controller 515 may then modify information of the copy in response to receiving the one or more transaction operators of the transaction. In one implementation, processing unit 520 may host one or more applications and initiate such a transaction, though claimed subject matter is not so limited.

Memory 522 is representative of any data storage mechanism. Memory 522 may include, for example, a primary memory 524 and/or a secondary memory 526. Primary memory 524 may include, for example, a random access memory, read only memory, etc. While illustrated in this example as being separate from processing unit 520, it should be understood that all or part of primary memory 524 may be provided within or otherwise co-located/coupled with processing unit 520.

Secondary memory 526 may include, for example, the same or similar type of memory as primary memory and/or one or more data storage devices or systems, such as, for example, a disk drive, an optical disc drive, a tape drive, a solid state memory drive, etc. In certain implementations, secondary memory 526 may be operatively receptive of, or otherwise configurable to couple to, a computer-readable medium 528. Computer-readable medium 528 may include, for example, any medium that can carry and/or make accessible data, code, and/or instructions for one or more of the devices in system 500.

Computing device 504 may include, for example, an input/output 532. Input/output 532 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 532 may include an operatively configured display, speaker, keyboard, mouse, trackball, touch screen, data port, etc.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
    receiving a transaction command comprising a transaction request, or multiple transaction operators;
    copying original contents in a first portion of a memory array to a second portion of said memory array in response to receiving said transaction request, wherein said memory array is a phase change memory (PCM) array and wherein said memory array is on one memory die; and
        modifying said original contents of said second portion in response to receiving said multiple transaction operators of said transaction command;
        providing a master remap table pointing to physical locations in said memory array;
        providing a temporary remap table corresponding to a portion of said master remap table affected by said transaction command;
        modifying said temporary remap table to reflect modifications made to said second portion of said memory array; and
        updating said master remap table based on modified contents of said temporary remap table.

2. The method of claim 1, wherein said transaction command further comprises a transaction commit to conclude said transaction command, and in response to receiving said transaction commit, determining whether a transaction associated with said transaction command was successful or failed; and
    if said transaction was successful:
        replacing said original contents of said first portion with said modified contents in said second portion, and if said transaction failed:
        rewriting over said modified contents in said second portion during a subsequent transaction.

3. The method of claim 1, wherein said temporary remap table points to a physical location in said memory where said second portion is located.

4. The method of claim 3, further comprising:
    modifying said temporary remap table in response to receiving said one or more transaction operators.

5. The method of claim 3, further comprising:
    simultaneously maintaining one or more additional temporary remap tables corresponding to one or more additional transactions.

6. The method of claim 1, further comprising:
    determining a maximum number of allowed transaction operators and/or a maximum size of said portion of said memory based, at least in part, on contents of a register.

7. The method of claim 3, further comprising:
    modifying said master remap table in response to receiving a transaction commit in said transaction command and in response to memory wear-leveling operations or bad memory-replacement operations.

8. A memory device comprising:
    at least one memory array; and
    a controller to:
    receive a transaction command comprising a transaction request or multiple transaction operators;
    copy original contents in a first portion of said at least one memory array to a second portion of said at least one memory array in response to receiving said transaction request, wherein said at least one memory array is a phase change memory (PCM) array and wherein said at least one memory array is on one memory die;
    modify said original contents of said second portion in response to receiving said multiple transaction operators of said transaction command;
    provide a master remap table pointing to physical locations in said at least one memory array;
    provide a temporary remap table corresponding to a portion of said master remap table affected by said transaction command;
    modify said temporary remap table to reflect modifications made to said second portion of said at least one memory array; and
    update said master remap table based on modified contents of said temporary remap table.

9. The memory device of claim 8, wherein said temporary remap table points to a physical location in said at least one memory array where said second portion is located.

10. The memory device of claim 9, wherein said controller is adapted to:
    modify said temporary remap table in response to receiving said one or more transaction operators.

11. The memory device of claim 9, further comprising:
    one or more additional temporary remap tables corresponding to one or more additional transactions.

12. The memory device of claim 8, further comprising:
    a register to store contents to indicate a maximum number of allowed transaction operators and/or a maximum size of said portion of said at least one memory array.

13. The memory device of claim 9, wherein said master remap table points to physical locations in said at least one memory array based, at least in part, on said one or more transaction operators and based, at least in part, on memory wear-leveling operations or bad memory-replacement operations.

14. The memory device of claim 8, further comprising:
    a spare area of said memory array to maintain said second portion.

15. The memory device of claim 8, wherein said controller comprises a transaction engine that operates based, at least in part, on a transaction protocol.

16. A system comprising:
a memory device comprising at least one memory array, wherein said at least one memory array is a phase change memory (PCM) array and wherein said at least one memory array is on one memory die, said memory device further comprising a memory controller to:
receive a transaction command comprising a transaction request, or multiple transaction operators;
copy original contents in a first portion of said at least one memory array to a second portion of said at least one memory array in response to receiving said transaction request; and
modify said original contents of said second portion in response to receiving said multiple transaction operators of said transaction command;
provide a master remap table pointing to physical locations in said at least one memory array;
provide a temporary remap table corresponding to a portion of said master remap table affected by said transaction command;
modify said temporary remap table to reflect modifications made to said second portion of said at least one memory array;
update said master remap table based on modified contents of said temporary remap table; and
a processor to host one or more applications and to initiate said transaction command.

17. The system of claim 16, wherein said temporary remap table points to a physical location in said at least one memory array where said second portion is located.

18. The system of claim 17, wherein said memory controller is adapted to:
modify said temporary remap table in response to receiving said one or more transaction operators.

19. The system of claim 17, further comprising:
one or more additional temporary remap tables corresponding to one or more additional transactions.

20. The system of claim 16, wherein said controller comprises a transaction engine that operates based, at least in part, on a transaction protocol.

\* \* \* \* \*